United States Patent
Goto et al.

(10) Patent No.: US 8,691,367 B2
(45) Date of Patent: Apr. 8, 2014

(54) MICRO CHANNEL STRUCTURE BODY AND METHOD OF MANUFACTURING MICRO CHANNEL STRUCTURE BODY

(75) Inventors: Hiroyuki Goto, Ebina (JP); Haruo Murayama, Hadano (JP); Susumu Kimijima, Yokohama (JP); Masahiko Ichishima, Hadano (JP)

(73) Assignee: Covalent Materials Corporation, Tokyo (JP)

( * ) Notice: Subject to any disclaimer, the term of this patent is extended or adjusted under 35 U.S.C. 154(b) by 1003 days.

(21) Appl. No.: 12/173,926

(22) Filed: Jul. 16, 2008

(65) Prior Publication Data

US 2009/0029115 A1   Jan. 29, 2009

(30) Foreign Application Priority Data

Jul. 20, 2007  (JP) .................................. 2007-189729

(51) Int. Cl.
*B32B 3/20* (2006.01)
*B32B 3/00* (2006.01)
*B32B 3/28* (2006.01)
*B32B 3/30* (2006.01)

(52) U.S. Cl.
USPC ............................ 428/188; 428/166; 428/167

(58) Field of Classification Search
USPC ......... 428/167, 188, 457, 161, 164, 163, 901, 428/131, 134, 136, 137, 138, 166
See application file for complete search history.

(56) References Cited

U.S. PATENT DOCUMENTS 4,216,487 A * 8/1980 Konishi et al. ................ 257/117

FOREIGN PATENT DOCUMENTS

| JP | 58095862 A * | 6/1983 |
|---|---|---|
| JP | 2006-078404 A | 3/2006 |
| JP | 2006-224014 A | 8/2006 |

* cited by examiner

*Primary Examiner* — Catherine A Simone
(74) *Attorney, Agent, or Firm* — Foley & Lardner LLP

(57) ABSTRACT

A micro channel structure body 10 in which a micro channel 3 having a predetermined cross-sectional shape is formed in a laminate where substrates 1a, 1b, and 1c having formed thereon electrodes 2a, 2b, and 2c made of a thin film are laminated sequentially. The above-mentioned micro channel 3 is formed in a perpendicular direction $\beta$ perpendicular to a lamination direction $\alpha$ of the above-mentioned laminate. Inner surfaces 3a and 3b of the above-mentioned micro channel 3 have an acute angle $\theta$ with respect to the lamination direction $\alpha$ of the above-mentioned laminate. The above-mentioned plurality of electrodes 2a, 2b, and 2c are formed and exposed in the lamination direction $\alpha$ of the inner surfaces 3a and 3b of the above-mentioned micro channel 3.

8 Claims, 6 Drawing Sheets

MICRO CHANNEL STRUCTURE BODY AND METHOD OF MANUFACTURING MICRO CHANNEL STRUCTURE BODY

BACKGROUND OF THE INVENTION

1. Field of the Invention

The present invention relates to a micro channel structure body used as a reaction site etc. in a chemistry process, and a method of manufacturing a micro channel structure body.

2. Description of the Related Art

Conventionally, the micro channel structure body is known which separates and analyzes a substance contained in a very small amount of liquid sample.

For example, as shown in FIG. 8, Japanese Patent Application Publication (KOKAI) No. 2006-224014 proposes a micro channel structure body 100 including an electrode part 103 which is embedded in and formed at one surface of a first substrate (glass substrate) 101 without any space at circumferential edges and is flush with the surface of this first substrate 101, a second substrate 102 being provided so that its one surface is in contact with the above-mentioned one surface of this first substrate 101, and a channel 104 formed by the above-mentioned first substrate 101 and the second substrate (glass substrate) 102.

Since the electrode part 103 is formed in the channel 104 in this type of micro channel structure body 100, it is possible to detect a concentration of a very small amount of flowing liquid and also a concentration of a target substance in the liquid etc.

Incidentally, for example, in the case of mixing and pouring a plurality of liquids into the micro channel, a concentration of the resulting liquid is not generally uniform along a cross-section of the micro channel. Therefore, there is a problem that, in the micro channel structure body proposed in Japanese Patent Application Publication (KOKAI) No. 2006-224014, the concentration of the liquid flowing inside the channel, the concentration of the target substance in the liquid, etc. cannot be detected correctly, since the electrode part is formed only at a bonded surface between the first substrate 101 and the second substrate 102, i.e., at the bottom of channel.

SUMMARY OF THE INVENTION

In such a situation, as described above, the present invention is aimed at providing a method of manufacturing a micro channel structure body and a micro channel structure body which can correctly detect a concentration of a liquid flowing inside a channel, a concentration of a target substance in the liquid, etc.

In order to solve the above mentioned problem, the micro channel structure body in accordance with the present invention is a micro channel structure body where a micro channel is formed in a laminate in which substrates and electrodes provided on the above-mentioned substrates are laminated sequentially, and characterized in that the above-mentioned micro channel includes an inner surface having an acute angle with respect to a lamination direction of the above-mentioned laminate, and a plurality of the above-mentioned electrodes are exposed in the above-mentioned lamination direction of the above-mentioned inner surface.

Since the plurality of electrodes are thus formed and exposed in the lamination direction of the inner surface of the above-mentioned micro channel, the concentration of the liquid which flows inside the channel, the concentration of the target substance in the liquid, etc. can be correctly detected.

Further, since the above-mentioned inner surface has the acute angle with respect to the lamination direction of the laminate in which the substrates and the electrodes provided on the above-mentioned substrates are laminated sequentially, an enlarged exposure area of the electrodes exposed at the above-mentioned inner surface can be formed. Thus, it is possible to raise sensitivity of each electrode, whereby the concentration of the liquid which flows inside the channel, the concentration of the target substance in the liquid, etc. can be detected more correctly.

Here, it is desirable that the plurality of above-mentioned electrodes are exposed in the above-mentioned lamination direction and a channel direction of the inner surface of the above-mentioned micro channel. Since the plurality of electrodes are thus formed and exposed not only in the lamination direction of the inner surface of the above-mentioned micro channel but also in the channel direction of the above-mentioned micro channel, it is possible to correctly detect a concentration change of the liquid in the channel direction or a concentration change of the target substance in the liquid etc., too.

Further, it is preferable that the above-mentioned angle is between 30° and 60° (inclusive). In the case where the above-mentioned angle is within the above-mentioned range, it is possible to form the above-mentioned inner surface comparatively easily.

Furthermore, it is desirable that a shape of the inner surface of the above-mentioned micro channel is formed in the shape of a triangle. Still further, it is desirable that the above-mentioned electrodes are formed in the shape of a rectangle at a part on the above-mentioned substrate, and the above-mentioned electrodes are exposed linearly at a part of the inner surface of the above-mentioned micro channel at predetermined intervals in the above-mentioned lamination direction. Even further, it is desirable that the above mentioned electrodes comprises a plurality of rectangular electrodes being formed at part on the above-mentioned substrate, and above-mentioned electrodes are exposed linearly at part of the inner surface of the above-mentioned micro channel at predetermined intervals in the above-mentioned lamination direction and in the channel direction of the above-mentioned micro channel.

Having such a structure, it is possible to form the above-mentioned inner surface comparatively easily.

In order to solve the above mentioned problems, a method of manufacturing a micro channel structure body in accordance with the present invention is characterized by including a step of laminating substrates having formed thereon an electrode made of a thin film sequentially to form a laminate, a step of forming a recess having an inner surface provided with an acute angle with respect to an upper surface of the above-mentioned laminate in a lamination direction of the above-mentioned laminate, and exposing a plurality of above-mentioned electrodes at the inner surface of the above-mentioned recess in the above-mentioned lamination direction or in the above-mentioned lamination direction and in an extending direction of the above-mentioned recess, and a step of closing an opening of the recess formed at the upper surface of the above-mentioned laminate, to form the above-mentioned recess as a micro channel.

According to such a manufacturing method, the plurality of electrodes can be easily formed in the lamination direction of the inner surface of the micro channel or in the above-mentioned lamination direction and the channel direction of the micro channel. In addition, it is desirable that a cross-sectional form of the above-mentioned recess is V-shaped. In the case where the recess form is V-shaped, it is possible to form the recess easily.

In order to solve the above mentioned problems, a method of manufacturing a micro channel structure body in accordance with the present invention is characterized by including a step of forming a first base provided with a step of laminating substrates having formed thereon an electrode made of a thin film sequentially to form a first laminate, and a step of forming a first recess having an inner surface provided with an acute angle with respect to an upper surface of the above-mentioned first laminate in a first lamination direction of the above-mentioned first laminate, and exposing a plurality of above-mentioned electrodes at the inner surface of the above-mentioned first recess in the above-mentioned first lamination direction or in the above-mentioned first lamination direction and an extending direction of the above-mentioned first recess; a step of forming a second base provided with a step of laminating substrates having formed thereon an electrode made of a thin film sequentially to form a second laminate, and a step of forming a second recess having an inner surface provided with an acute angle with respect to an upper surface of the above-mentioned second laminate in a second lamination direction of the above-mentioned second laminate, and exposing a plurality of above-mentioned electrodes at the inner surface of the above-mentioned second recess in the above-mentioned second lamination direction or in the above-mentioned second lamination direction and an extending direction of the above-mentioned second recess; and a step of bonding the above-mentioned first base with the above-mentioned second base so that the first recess formed in the above-mentioned first base and the second recess formed in the above-mentioned second base may face each other, to thereby form a micro channel having the above-mentioned first recess and second recess.

According to such a manufacturing method, the plurality of electrodes can be easily formed in the lamination direction of the inner surface of the micro channel or in the lamination direction and the channel direction of the micro channel. In addition, it is desirable that the cross-sectional form of the above-mentioned recess is V-shaped. In the case where the recess form is V-shaped, it is possible to form the recess comparatively easily. In this case, the micro channel to be formed is quadrangular (for example, rhomboidal).

According to the present invention, it is possible to provide the micro channel structure body which can correctly detect the concentration of the liquid flowing inside the channel, the concentration of the target substance in the liquid, etc., and the method of manufacturing the micro channel structure body.

BRIEF DESCRIPTION OF THE DRAWINGS

FIG. 1A is a perspective view and FIG. 1B is a sectional view taken along the line A-A in FIG. 1A.

FIG. 4A is a front view and FIG. 4B is a sectional view taken along the line B-B in FIG. 4A.

DESCRIPTION OF THE PREFERRED EMBODIMENT

Hereafter, a first preferred embodiment of a micro channel structure body in accordance with the present invention will be described with reference to FIGS. 1A and 1B. In addition, FIGS. 1A and 1B are views showing an outline structure of a micro channel structure body 10 in accordance with the first preferred embodiment, where FIG. 1A is a perspective view and FIG. 1B is a sectional view taken along the line A-A in FIG. 1A.

Figure 1A:
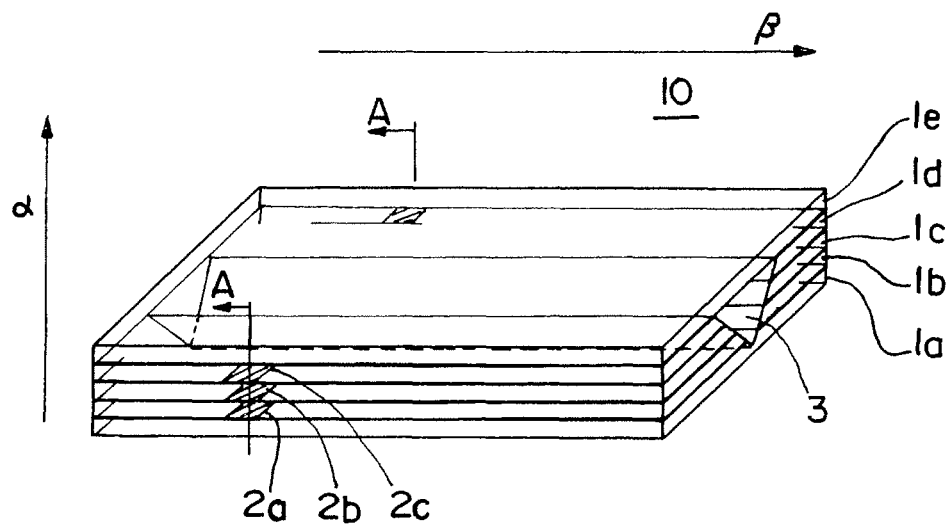
FIGS. 1A and 1B are views showing an outline structure of a micro channel structure body in accordance with a first preferred embodiment, where
Figure 1B:
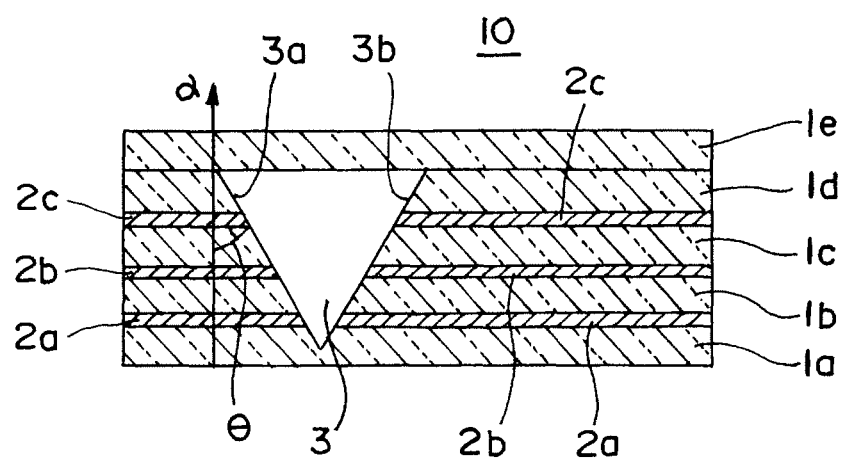

As shown in FIGS. 1A and 1B, this micro channel structure body 10 is such that substrates 1a, 1b, and 1c having respectively formed thereon electrodes 2a, 2b, and 2c made of a thin film (for example 0.1-10 μm in thickness) are laminated sequentially, and substrates 1d and 1e having formed thereon no electrode are further laminated to the substrate 1c on which the above-mentioned electrode 2c is formed.

Further, a micro channel 3 is formed at a laminate where the above-mentioned substrates 1a, 1b, 1c, 1d, and 1e are laminated (it cuts) so that it crosses (transversely across) the above-mentioned electrodes 2a, 2b, and 2c.

In other words, the micro channel 3 is formed inside the laminate so that it may be formed in a perpendicular direction β which is perpendicular to a lamination direction α of the above-mentioned laminate.

Further, inner surfaces 3a and 3b of the micro channel 3 are provided with an acute angle θ with respect to the lamination direction α of the above-mentioned laminate.

Furthermore, the respective electrodes 2a, 2b, and 2c are formed and exposed in the lamination direction α of part of the inner surfaces 3a and 3b of the micro channel 3 at predetermined intervals.

Since the plurality of electrodes 2a, 2b, and 2c are thus formed and exposed in the lamination direction α of the inner surfaces 3a and 3b of the micro channel 3, it is possible to correctly detect a concentration of a liquid flowing inside the channel, a concentration of a target substance in the liquid, etc.

Furthermore, the inner surfaces 3a and 3b are provided with the acute angle θ with respect to the lamination direction α. In addition, an exposure area in which the electrodes 2a, 2b, and 2c are exposed at the inner surfaces 3a and 3b is substantially equivalent to a film thickness of the electrodes 2a, 2b, and 2c in the case where the above-mentioned angle θ is 0° (where the inner surfaces 3a and 3b are parallel to the lamination direction α, that is, where a shape of the micro channel 3 is square). In this case, detection sensitivity of the concentration of the liquid flowing inside the channel or the concentration of the target substance in the liquid decreases in the case where the film thickness of the electrodes 2a, 2b, and 2c is thin and the exposure area of the electrodes 2a, 2b, and 2c is small. For this reason, the film thickness of the electrodes 2a, 2b, and 2c needs to have a certain amount of thickness.

However, as illustrated in the present preferred embodiment, since the inner surfaces 3a and 3b are arranged to have the acute angle θ with respect to the lamination direction α, it is possible to provide the exposure area which is equal to or greater than the equivalent film thickness of the electrodes 2a, 2b, and 2c, compared with the case where they are parallel to (θ=0°) the lamination direction α, whereby the sensitivity of each electrode exposed at the inner surfaces 3a and 3b can be raised, and the concentration of the liquid flowing inside the channel, the concentration of the target substance in the liquid, etc. can be detected more correctly.

Further, it is preferable that the above-mentioned angle θ is between 30° and 60° (inclusive). In the case where the above-mentioned angle is within the above-mentioned range, it is possible to form the above-mentioned inner surfaces 3a and 3b comparatively easily.

In the present preferred embodiment, a shape of the inner surfaces 3a and 3b of the micro channel 3 is formed in the shape of a triangle. In addition, the shape of the inner surfaces 3a and 3b of the micro channel 3 is not limited to the shape of the triangle. As long as it has the acute angle θ with respect to the above-mentioned lamination direction α, the shape of the inner surfaces 3a and 3b may be semicircle-shaped. Further, although not shown, it may be the micro channel 3 which has a trapezoid (or trapezium) channel where the inner surfaces 3a and 3b serve as side walls and a bottom is a plane whose angle (θ=90°) is perpendicular to the lamination direction α. However, in the case where the shape of the inner surfaces 3a and 3b of the micro channel 3 is arranged to be triangle-shaped, since it is easy to form the inner surfaces 3a and 3b, the micro channel structure body can be obtained comparatively easily in the manufacture.

However, at the part of the inner surfaces 3a and 3b of the above-mentioned micro channel 3, the electrodes 2a, 2b, and 2c are formed at predetermined intervals in the lamination direction, thus it is necessary for the above-mentioned micro channel 3 to be formed to cross (transversely across) the electrodes 2a, 2b, and 2c.

In the present preferred embodiment, the electrodes 2a, 2b, and 2c are respectively formed at part of the substrates 1a, 1b, and 1c in the shape of a rectangle, and formed to stack in the lamination direction in a state where the above-mentioned substrates 1a, 1b, and 1c are laminated. Further, each of the substrates 1a, 1b, and 1c is formed to have a predetermined thickness, and the electrodes 2a, 2b, and 2c are arranged at predetermined intervals in the lamination direction.

In addition, as long as one end is exposed at the inner surfaces 3a and 3b of the micro channel 3 and the other end is exposed near or to a perimeter of the laminate, the shape of the electrodes 2a, 2b, and 2c is not limited to the rectangular shape, and various shapes can be employed. However, since the rectangle form is simple in shape, it is possible to form them on the substrates 1a and 1b and 1c comparatively easily.

As long as a material of substrates 1a, 1b, 1c, 1d, and 1e is electrically insulative, it is not limited in particular. Preferably, a plastic substrate and a glass substrate can be used.

Further, a material of the electrodes 2a, 2b, and 2c is not limited in particular, as long as it is electrically conductive. For example, metals, such as aluminum, silver, nickel, molybdenum, copper, gold, platinum, etc., or alloys including two or more of these metals, conductive metal oxides, such as ITO (indium tin oxide), indium oxide, conductive tin oxide, conductive zinc oxide, etc., and conductive polymers, such as poly aniline, polypyrole, polytheophene, etc. are suitably used.

In addition, the method of forming these electrodes 2a, 2b, and 2c at the substrates 1a, 1b, and 1c is not limited in particular, as long as it is a method which produces neither peeling nor disconnection. As examples of such, there may be mentioned various types of vapor deposition processes, such as an electron-beam heating vapor deposition process, a hot filament deposition process, various types of PVD (physical vapor deposition) processes, such as a sputtering process, an ion plating process, and a laser ablation process, various types of CVD (chemical vapor deposition) processes, a screen printing process, a lift-off process, a sol-gel process, etc. In other words, based on a lithography technology and an etching technology, the electrodes 2a, 2b, and 2c can be formed at the substrates 1a, 1b, and 1c.

Next, one preferred embodiment of the method of manufacturing the micro channel structure body in accordance with the first preferred embodiment will be described with reference to FIGS. 2A-2D, and FIG. 3. In addition, FIGS. 2A-2D are views showing a process of manufacturing the micro channel structure body in accordance with the first preferred embodiment, and FIG. 3 is a sectional view taken along the line B-B in FIG. 2C.

Figure 2A:
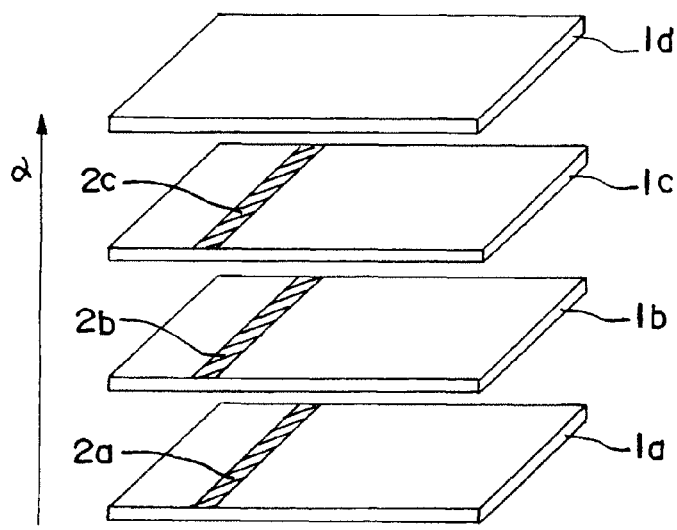
FIGS. 2A-2D are views showing a method of manufacturing the micro channel structure body in accordance with the first preferred embodiment.
Figure 3:
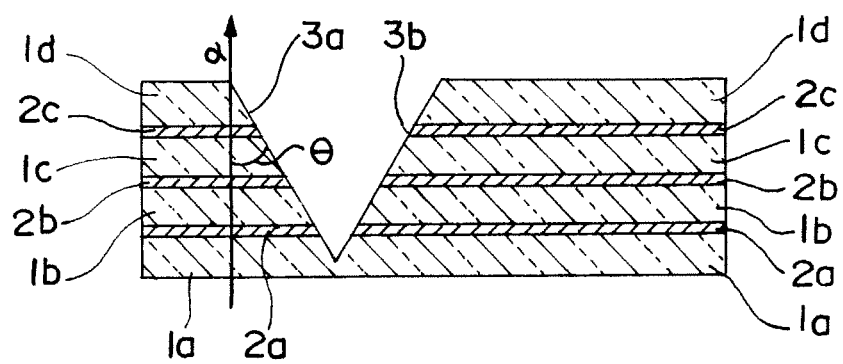
FIG. 3 is a sectional view taken along the line B-B in FIG. 2C.

Firstly, as shown in FIG. 2A, the electrodes 2a, 2b, and 2c are respectively formed on three substrates 1a and 1b and 1c, where glass substrates are used as the substrates 1a, 1b, and 1c. For example, based on the lithography technology and etching technology, the electrodes 2a, 2b, and 2c made of molybdenum are patterned into rectangles each having a thickness of 0.5 μm.

Figure 2B:
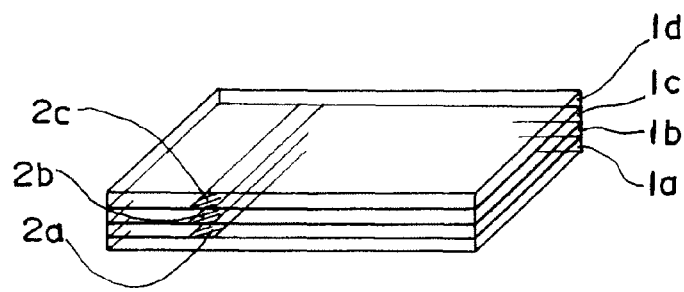

Next, as shown in FIG. 2B, the above-mentioned substrates 1a, 1b, and 1c are stacked up so that the above-mentioned electrodes 2a, 2b, and 2c may stack perpendicularly (the lamination direction α), and the substrates 1d on which the electrode is not formed is further stacked on and laminated to the substrate 1c.

Then, the laminated substrates 1a, 1b, 1c, and 1d are heated, and the substrates 1a, 1b, 1c, and 1d are fused and integrated. In addition, the method of integrating the substrates may be carried out in such a way that the substrates 1a, 1b, 1c, and 1d are laminated by means of adhesives among them other than fusing.

Figure 2C:
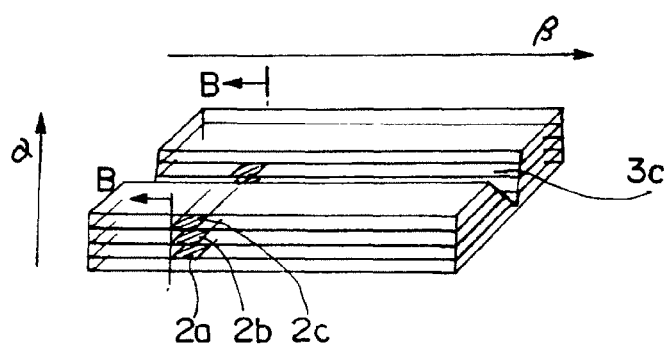

As shown in FIG. 2C, a machining process is performed from above an upper surface of the laminated substrates 1a, 1b, 1c and 1d i.e., from above a surface in contact with the electrode 2c of the substrate 1d, and a recess (recess having a shape of V in the present preferred embodiment, hereafter referred to as V-shaped recess) 3c is formed which is provided with the inner surfaces having the acute angle θ with respect to the lamination direction α in cross-section.

In addition, this recess machining process may be arbitrarily selected from machining processes suitable for the material of the substrates 1a, 1b, 1c, and 1d. Since the electrodes 2a, 2b, and 2c have a characteristic different from that of the substrates 1a, 1b, 1c, and 1d, a machining process using a drill, an end mill, a byte, etc. is more suitable than chemical removal processes, such as etching. In this case, it is necessary to determine machining process conditions, paying attention to deformation of the recess or peeling of the electrode.

This V-shaped recess 3c is extended in the direction β perpendicular to the lamination direction α at the laminated substrates 1a, 1b, 1c, and 1d, and the above-mentioned electrodes 2a, 2b, and 2c expose at the inner surfaces 3a and 3b of the above-mentioned V-shaped recess 3c in the lamination direction α. In other words, as shown in FIGS. 2C and 3, the electrodes 2a, 2b, and 2c face mutually so that respective pairs of electrodes expose at the inner surfaces 3a and 3b of the V-shaped recess 3c and the electrodes 2a, 2b, and 2c regularly expose at predetermined intervals (intervals of thicknesses of substrates) in the lamination direction α of the inner surfaces 3a and 3b of the V-shaped recess 3c.

The above-mentioned V-shaped recess 3c is formed such that the angle θ with respect to the lamination direction α of the substrates 1a, 1b, 1c, and 1d is less than 90° (acute angle). Preferably, it is formed such that the angle θ with respect to the lamination direction is between 30° and 60° (inclusive).

Figure 2D:
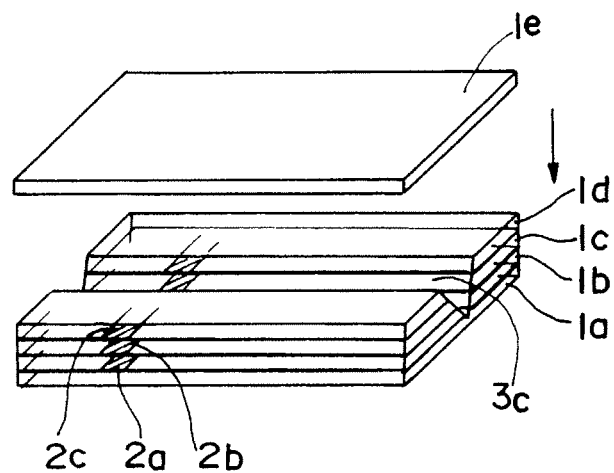

After forming the above mentioned V-shaped recess 3c, as shown in FIG. 2D, the substrate 1e is fused or laminated via the adhesive to the upper surface of the above-mentioned substrate 1d, whereby an opening of the V-shaped recess 3c formed in the stacked laminate is closed, and the above-mentioned V-shaped recess 3c is formed as the micro channel 3 which has a triangle-like shape in cross-section.

Figure 4A:
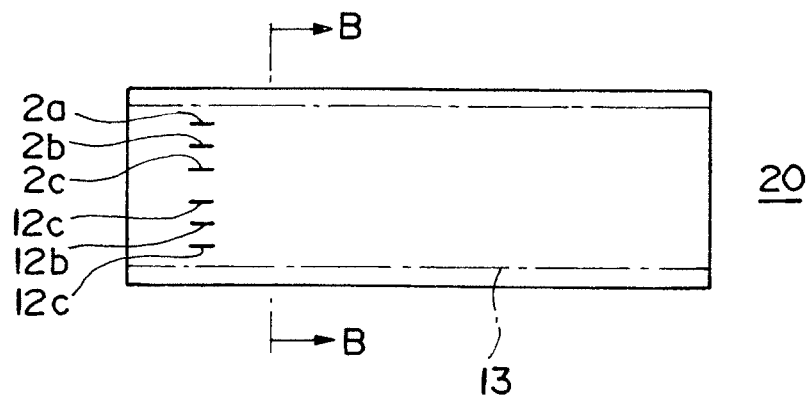
FIGS. 4A and 4B are views showing a second preferred embodiment of the micro channel structure body of the present invention, where
Figure 4B:
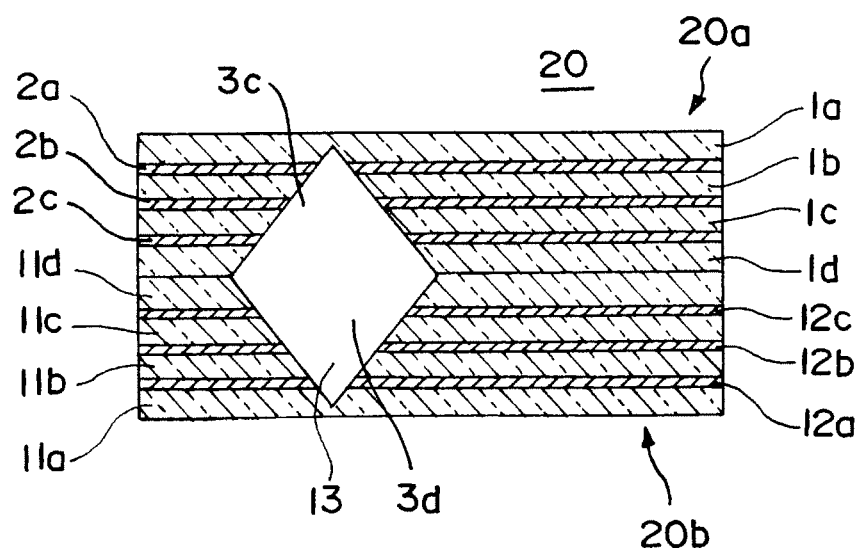

Next, a second preferred embodiment of the micro channel structure body in accordance with the present invention will be described with reference to FIGS. 4A and 4B. FIGS. 4A and 4B are views showing the second preferred embodiment of the micro channel structure body of the present invention, where FIG. 4A is a front view and FIG. 4B is a sectional view taken along the line B-B in FIG. 4A.

A micro channel structure body 20 in accordance with the present preferred embodiment is provided with a laminate (first laminate) 20a in which the substrates 1a, 1b, 1c, and 1d as shown in FIG. 2C, as described above, are laminated and the V-shaped recess 3c is formed, and also provided with a laminate (second laminate) 20b in which the substrates 11a, 11b, 11c, and 11d are laminated and a V-shaped recesses 3d is formed like the above-mentioned first laminate 20a. These substrates 11a, 11b, and 11c have formed thereon electrodes 12a, 12b, and 12c like the above-mentioned substrates 1a, 1b, and 1c.

Then, the above-mentioned first laminate 20a and the above-mentioned second laminate 20b are bonded together so that the recess 3c formed in the above-mentioned first laminate 20a and the recess 3d formed in the above-mentioned second laminate 20b may face each other to form a channel 13.

The thus formed micro channel 13 of the micro channel structure body 20 has a quadrangular (for example, rhomboidal) cross-section. More electrodes (six pairs, 12 electrodes in total, in this preferred embodiment) are formed at its inner surfaces, and it is possible to measure concentration distribution in the lamination direction α of the micro channel 13 etc. more correctly.

Since other structures and processes are the same as those of the first preferred embodiment, the description of these will not be repeated.

Figure 5:
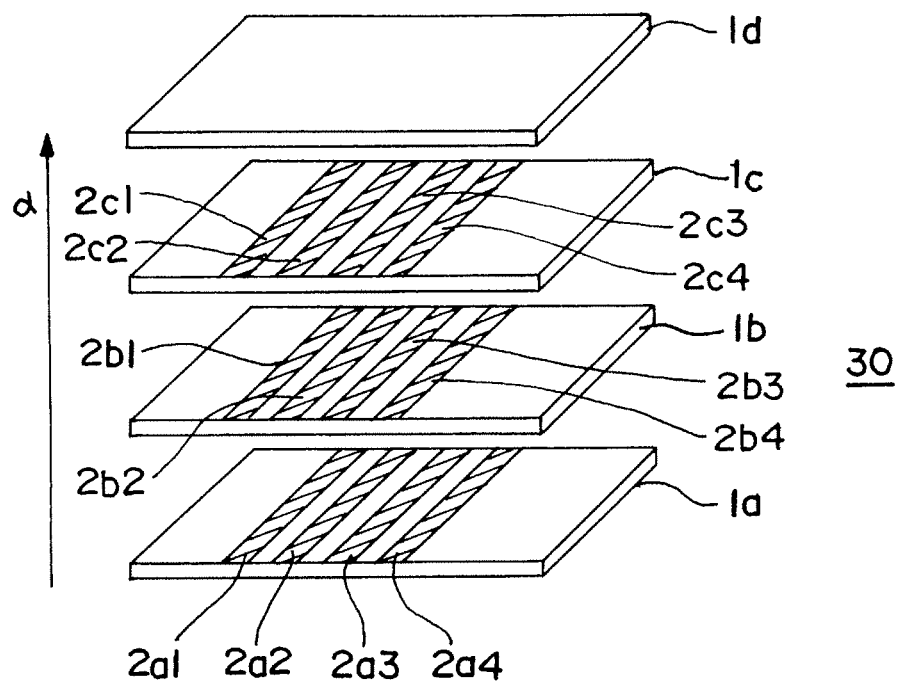
FIG. 5 is a view showing the method of manufacturing the micro channel structure body in accordance with a third preferred embodiment.

Further, a third preferred embodiment of the micro channel structure body in accordance with the present invention will be described with reference to FIGS. 5 and 6. FIG. 5 is a view showing the method of manufacturing the micro channel structure body in accordance with the third preferred embodiment, and FIG. 6 is a view showing an outline structure of the micro channel structure body in accordance with the third preferred embodiment.

A micro channel structure body 30 in accordance with the present preferred embodiment is characterized in that a plurality of electrodes 2a1-2a4, 2b1-2b4, and 2c1-2c4 are formed on the respective substrates 1a, 1b, and 1c.

In the above-mentioned first preferred embodiment, one rectangular electrode is formed on the substrate, and it is possible to measure the concentration when the liquid flowing through the micro channel 3 comes into contact with the above-mentioned electrode which is exposed at the inner surface of the liquid channel 3, etc. However, it is not possible to measure a concentration change in a flow direction of the micro channel 3 etc.

Figure 6:
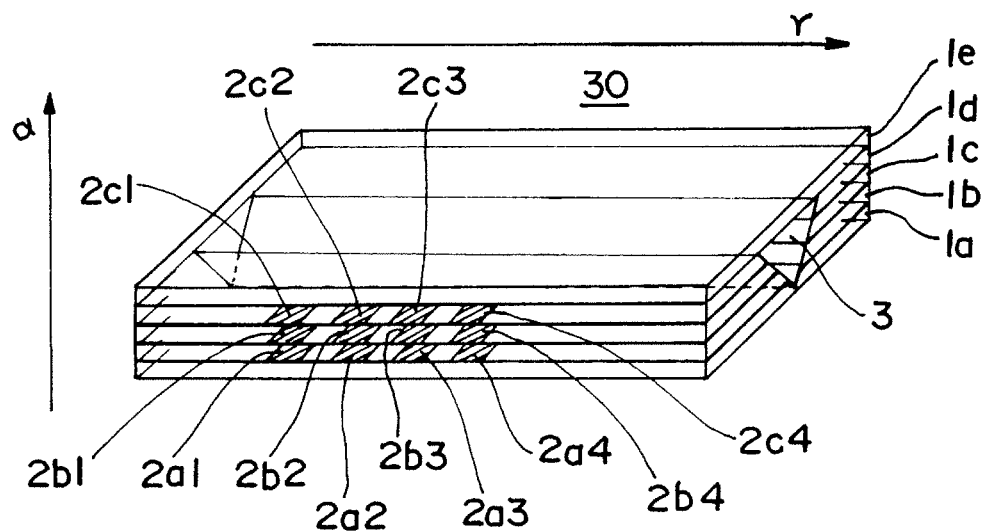
FIG. 6 is a view showing an outline structure of the micro channel structure body in accordance with the third preferred embodiment.

In the third preferred embodiment, as shown in FIG. 6, the plurality of electrodes 2a1-2a4, 2b1-2b4, and 2c1-2c4 are formed not only in the lamination direction α of the substrates 1a, 1b, 1c, and 1d but also in a flow direction γ(channel direction, the same direction as the above-mentioned perpendicular direction β) of the micro channel 3.

Thus, the plurality of electrodes are formed and exposed not only in the lamination direction of the inner surface of the micro channel but also in the channel direction of the micro channel, therefore even the concentration change of the liquid in the channel direction, the concentration change of the target substance in the liquid, etc. can correctly be detected.

Since other structures and processes are the same as those of the first preferred embodiment, the description of these will not be repeated.

In addition, as for the above-mentioned first to third micro channel structure bodies, the description is carried out with reference to the laminate in which the substrates and the electrodes provided on the substrates are laminated sequentially, to which the substrate not having formed thereon an electrode is further laminated. However, the present invention is not limited to this and the substrate not having formed thereon the electrode may not be used. In this case, the V-shaped recess 3c is formed by way of machining from the upper surface of the laminated substrates 1a, 1b, and 1c as shown in FIG. 2A-2D, i.e., from above the surface of the electrode 2c of the substrate 1c.

Figure 7:
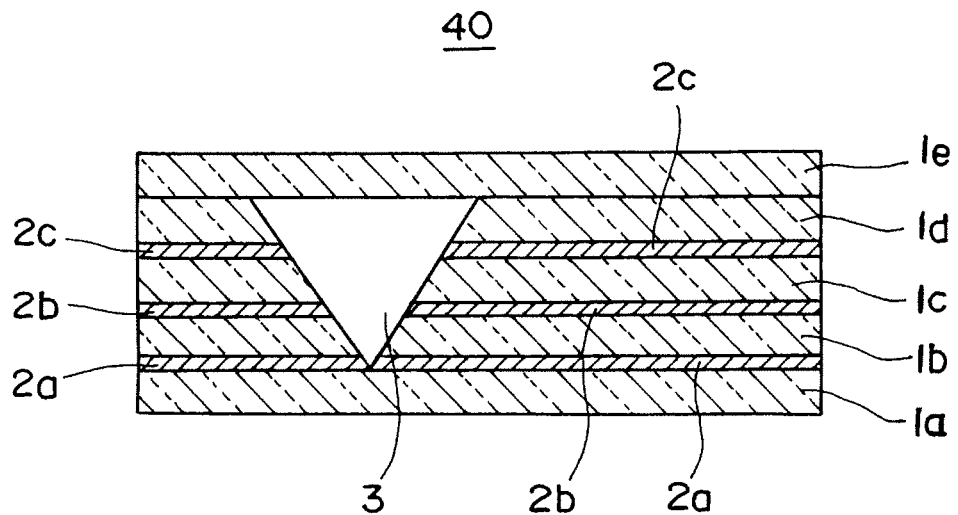
FIG. 7 is a sectional view showing a modification of the micro channel structure body in accordance with the first preferred embodiment.
Figure 8:
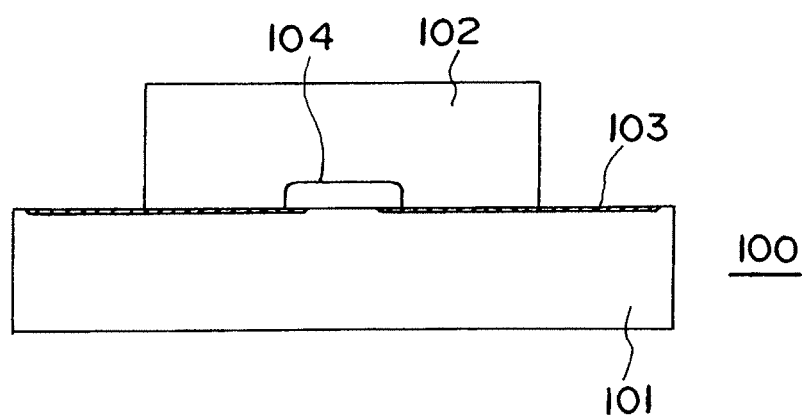
FIG. 8 is a side view showing a conventional micro channel structure body.

Further, as shown in FIG. 7, it is possible to form the recess 3 so that the top of the micro channel 3 may be located at the electrode 2a.

Furthermore, even if the arrangement of the micro channel structure body of the above-mentioned third preferred embodiment i.e., the arrangement in which the plurality of electrodes are formed in the flow direction of the micro channel 3 is incorporated into the arrangement of the micro channel structure body of the second preferred embodiment, the similar effects can naturally be obtained.

Example

Then, the micro channel structure body in accordance with the present invention will be further described with reference to Example.

A rectangular Mo electrode pattern having a film thickness of 500 nm was formed on a surface of a square borosilicate glass substrate whose one side is 20 mm and has a thickness of 0.2 mm by way of a lithography technology and an etching technology. Two borosilicate glass substrates having formed thereon this Mo electrode pattern were manufactured, and then laminated so that an electrode side of one substrate was located on a non-electrode side of the other substrate.

Then, the square borosilicate glass substrate whose one side was 20 mm which had a thickness of 0.2 mm and where the Mo electrode pattern was not formed was arranged on the electrode side of the above-mentioned other substrate. The square borosilicate glass substrate whose one side was 20 mm which had a thickness of 3 mm and where the Mo electrode pattern was not formed was arranged on the non-electrode side of one substrate.

Subsequently, while the borosilicate glass substrates having the above-mentioned Mo electrode pattern were being sandwiched and held by the above-mentioned two borosilicate glass substrates not having formed thereon the Mo electrode pattern, they were pressed and fused in vacuo at 650° C.

Then, from the square borosilicate glass substrate side whose one side was 20 mm which had a thickness of 0.2 mm and where the Mo electrode pattern was not formed, a pattern to be used as the micro channel was machined by means of a tip of a single crystal diamond drill having a diameter of 2 mm whose tip had a radius (R) of 4 μm, to provide a V-shaped recess with a depth of 0.6 mm and manufacture a laminate having formed therein the V-shaped recess.

Furthermore, a laminate having the same structure and having formed therein another V-shaped recess was similarly manufactured as described above. Then, both the laminates were opposed so that their recess patterns might be mutually matched, heated to 650° C., and fused to form the micro channel.

As such, four pairs of (eight in total) electrodes were formed in the lamination direction of the inner surface of the micro channel.

This application claims priority from Japanese Patent Application 2007-189729, filed Jul. 20, 2007, which is incorporated herein by reference in their entirety.

What is claimed is:

1. A micro channel structure body comprising:
a micro channel formed by enclosing an upper part of a recess formed inside of a laminate in which substrates and electrodes provided on said substrates are laminated sequentially so that a liquid flows inside said micro channel,
wherein said micro channel includes:
an inner surface having an acute angle with respect to a lamination direction of said laminate, and
a plurality of said electrodes exposed in said lamination direction of said inner surface,
wherein said micro channel structure body separates, analyzes, or both, a substance in the liquid by said electrodes.

2. The structure body according to claim 1, wherein said plurality of said electrodes are exposed in said lamination direction and in a channel direction of said inner surface of said micro channel.

3. The structure body according to claim 1, wherein said angle is between 30° and 60° (inclusive).

4. The structure body according to claim 1, wherein the shape of the inner surface of said micro channel is formed in the shape of a triangle.

5. The structure body according to claim 1, wherein said electrodes are formed into a shape of a rectangle at part on said substrates, and said plurality of said electrodes are exposed linearly at part of said inner surface of said micro channel at predetermined intervals in said lamination direction.

6. The structure body according to claim 2, wherein said electrodes comprise a plurality of rectangular electrodes being formed at part on said substrates, and said plurality of said electrodes are exposed linearly at part of said inner surface of said micro channel at predetermined intervals in said lamination direction and in the channel direction of said micro channel.

7. The structure body according to claim 1, wherein said micro channel structure body is configured to detect one of a concentration of the liquid flowing inside the micro channel and a concentration of a target substance in the liquid.

8. The structure body according to claim 1, wherein said micro channel is extended in a direction perpendicular to the lamination direction of said laminate in said laminate.

* * * * *